United States Patent
Guo et al.

(10) Patent No.: US 11,828,639 B2
(45) Date of Patent: Nov. 28, 2023

(54) WATER GAUGE FOR ON-SITE MONITORING AND EARLY WARNING

(71) Applicant: CHINA THREE GORGES UNIVERSITY, Yichang (CN)

(72) Inventors: Jiali Guo, Yichang (CN); Jiahui Gu, Yichang (CN); Yinghai Li, Yichang (CN)

(73) Assignee: CHINA THREE GORGES UNIVERSITY, Yichang (CN)

( * ) Notice: Subject to any disclaimer, the term of this patent is extended or adjusted under 35 U.S.C. 154(b) by 0 days.

(21) Appl. No.: 17/853,882

(22) Filed: Jun. 29, 2022

(65) Prior Publication Data

US 2023/0003568 A1 Jan. 5, 2023

(30) Foreign Application Priority Data

Jul. 1, 2021 (CN) .......................... 202110750332.1

(51) Int. Cl.
*G01F 23/00* (2022.01)
*G01F 23/04* (2006.01)

(52) U.S. Cl.
CPC .......... *G01F 23/04* (2013.01); *G01F 23/0015* (2013.01)

(58) Field of Classification Search
CPC .... G01F 23/04; G01F 23/0015; G01F 23/804; G01F 22/00; G01F 23/0007; G01F 23/00; Y02A 50/00
USPC .......... 73/290 R–322, 290 V; 116/67 R, 109, 116/110
See application file for complete search history.

(56) References Cited

U.S. PATENT DOCUMENTS

2017/0089749 A1 * 3/2017 Baker ..................... G01C 9/02

FOREIGN PATENT DOCUMENTS

| CN | 203192179 U | | 9/2013 | |
|---|---|---|---|---|
| CN | 103852138 A | | 6/2014 | |
| CN | 105678966 A | * | 6/2016 | |
| CN | 107816979 A | | 3/2018 | |
| CN | 107941305 A | * | 4/2018 | ............. G01F 23/24 |
| CN | 108168644 A | | 6/2018 | |
| CN | 109698470 A | | 4/2019 | |
| CN | 111289061 A | * | 6/2020 | ............. E21F 17/18 |
| CN | 111854892 A | * | 10/2020 | ............. G01F 23/30 |
| CN | 111879376 A | * | 11/2020 | |
| CN | 112113631 A | * | 12/2020 | ............. G01F 23/00 |
| CN | 112857526 A | * | 5/2021 | |
| KR | 101597279 B1 | * | 3/2016 | |

* cited by examiner

*Primary Examiner* — Robert R Raevis
(74) *Attorney, Agent, or Firm* — Bayramoglu Law Offices LLC

(57) ABSTRACT

A water gauge for on-site monitoring and early warning includes an alarm part, a control part and a retractable part. The retractable part is fixedly connected with the alarm part at the top, and the control part at the bottom; the alarm part is electrically connected with the control part through a wire; the control part compares the water level measured by the retractable part with a preset threshold, to determine whether the alarm part needs to give an alarm. When the water on the road rises to the warning line of 30 cm set on the water gauge during a rainstorm, the warning light on the top of the water gauge will start to flash, and the water gauge will give an alarm through the speaker, reminding the pedestrians and vehicles not to pass the section for the time being.

12 Claims, 1 Drawing Sheet

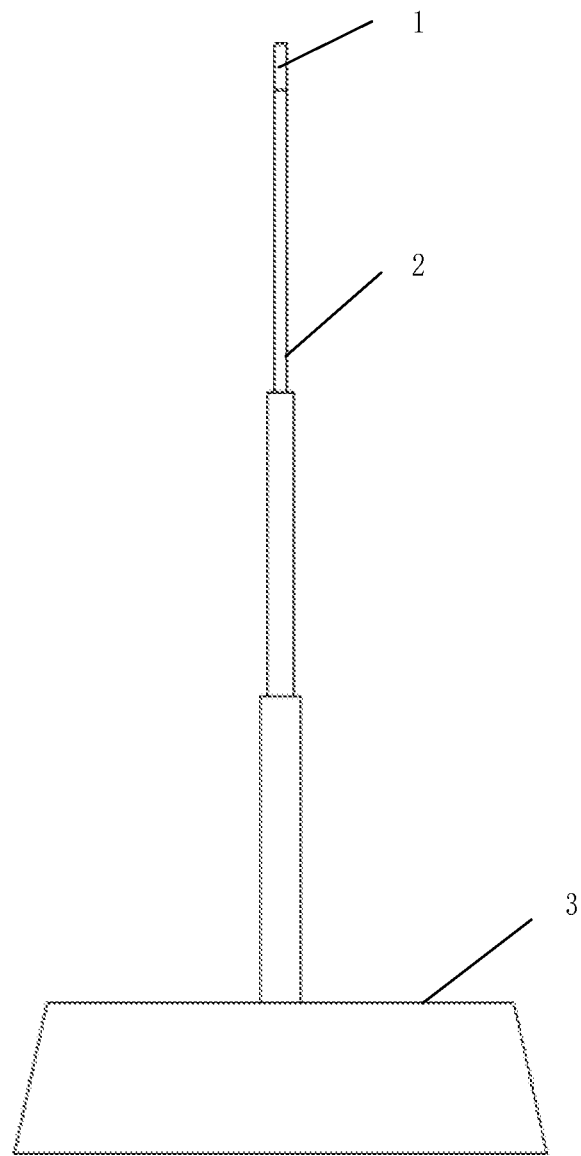

WATER GAUGE FOR ON-SITE MONITORING AND EARLY WARNING

CROSS REFERENCE TO THE RELATED APPLICATIONS

This application is based upon and claims priority to Chinese Patent Application No. 202110750332.1 filed on Jul. 1, 2021, the entire contents of which are incorporated herein by reference.

TECHNICAL FIELD

The present invention relates to the technical field of monitoring and early warning, in particular to a water gauge for on-site monitoring and early warning.

BACKGROUND

At present, there are no devices in cities supporting real-time monitoring and early warning of urban waterlogging, and only some navigation software allows users to report ponded sections. As a result, only the roads reported by the users can be inquired for ponding information, which may not be the latest news. Drivers and pedestrians are thereby limited to the capable mobile phone software for ponding information, which is far from achieving real-time monitoring and on-site warning effects.

In a flood season, ponded roads after a long and heavy rain in the city may affect the normal travel of vehicles, and even submerge vehicles and endanger lives. In view of this, setting a device that can monitor the condition of roads in real time and give an alarm when the water level reaches the warning value in the urban waterlogging-prone sections can effectively remind drivers and pedestrians to avoid the dangerous sections, protecting the people and reducing the loss of vehicles.

SUMMARY

In view of the above problem, the present invention provides a water gauge for on-site monitoring and early warning, which comprises a control part, an alarm part and a retractable part. If the device is placed into the waterlogging-prone section in advance and the retractable water gauge is raised to the highest level, when the water on the road rises to the warning line of 30 cm set on the water gauge during a rainstorm, the warning light on the top of the water gauge will start to flash. At the same time, the water gauge will give an alarm through the speaker, reminding the pedestrians and vehicles not to pass the section for the time being, to avoid the risk of drowning or vehicle breakdown.

To achieve the above purpose, the present invention is implemented with the following technical scheme:

A water gauge for on-site monitoring and early warning, which comprises an alarm part, a control part and a retractable part. The said retractable part is fixedly connected with the said alarm part at the top, and the said control part at the bottom; the said alarm part is electrically connected with the said control part through a wire; the said control part compares the water level measured by the said retractable part with a preset threshold, to determine whether the alarm part needs to give an alarm.

Through the above technical scheme, the present invention realizes the following beneficial effects: reminding the pedestrians and vehicles not to pass the dangerous section temporarily to avoid drowning and vehicle breakdown.

Preferably, in the above-mentioned water gauge for on-site monitoring and early warning, the said control part comprises a control box, a circuit board and a battery. The said battery is placed at the bottom of the said control box; the said circuit board is installed in the said control box; the said battery powers the said circuit board.

Preferably, in the above-mentioned water gauge for on-site monitoring and early warning, the said circuit board comprises a wireless charging module, a control module and a wireless communication module. The said wireless charging module is electrically connected to the said battery; the said control module is connected to the said alarm part and the said wireless communication module; the said wireless communication module wirelessly interacts with the cloud.

Preferably, in the above-mentioned water gauge for on-site monitoring and early warning, the said alarm part consists of one or more of a visual alarm, an auditory alarm, a tactile alarm and an olfactory alarm.

Preferably, in the above-mentioned water gauge for on-site monitoring and early warning, the said alarm part comprises an insulating housing and a sensor set in it. The said sensor is used to detect the current water level.

Preferably, in the above-mentioned water gauge for on-site monitoring and early warning, the said insulating housing comprises outer and inner tubes. The said inner tube in n sections is sleeved with the said outer tube, and slides inside the said outer tube.

Preferably, the above-mentioned water gauge for on-site monitoring and early warning further comprises a level gauge, to determine the inclination angle of the said retractable part.

Preferably, the above-mentioned water gauge for on-site monitoring and early warning further comprises a cloud server and a terminal. The said cloud server communicates with the said wireless communication module and the said terminal.

According to the above technical scheme, compared with the prior art, the present invention provides a water gauge for on-site monitoring and early warning, which comprises a control part, an alarm part and a retractable part. If the device is placed into the waterlogging-prone section in advance and the retractable water gauge is raised to the highest level, when the water on the road rises to the warning line of 30 cm set on the water gauge during a rainstorm, the warning light on the top of the water gauge will start to flash. At the same time, the water gauge will give an alarm through the speaker, reminding the pedestrians and vehicles not to pass the section for the time being, to avoid the risk of drowning or vehicle breakdown.

BRIEF DESCRIPTION OF THE DRAWINGS

To better describe the embodiment of the present invention or the technical scheme of the prior art, a brief introduction of the accompanying drawings to be used in the descriptions of the embodiment or the prior art is made hereby. Obviously, the drawings below are only the embodiment of the present invention, and for those ordinarily skilled in the art, other drawings based on such drawings can be obtained without making creative endeavors.

FIGURE is a structural diagram of the present invention.

DETAILED DESCRIPTION OF THE EMBODIMENTS

The technical scheme in the embodiment of the present invention is clearly and completely described below in combination with the drawings thereof. Obviously, the embodiment is just a part of embodiments of the present invention, not all of them. Based on the embodiment of the present invention, all the other embodiments obtained by those ordinarily skilled in the art without making creative endeavors shall fall into the scope of protection of the present invention.

According to the background art, there are no devices in cities supporting real-time monitoring and early warning of urban waterlogging, and only some navigation software allows users to report ponded sections. As a result, only the roads reported by the users can be inquired for ponding information, which may not be the latest news. Drivers and pedestrians are thereby limited to the capable mobile phone software for ponding information, which is far from achieving real-time monitoring and on-site warning effects.

Accordingly, the water gauge for on-site monitoring and early warning disclosed in the embodiment of the present invention comprises a control part 3, an alarm part 1 and a retractable part 2. If the device is placed into the waterlogging-prone section in advance and the retractable water gauge is raised to the highest level, when the water on the road rises to the warning line of 30 cm set on the water gauge during a rainstorm, the warning light on the top of the water gauge will start to flash. At the same time, the water gauge will give an alarm through the speaker, reminding the pedestrians and vehicles not to pass the section for the time being, to avoid the risk of drowning or vehicle breakdown.

Specifically, an embodiment of the present invention discloses a water gauge for on-site monitoring and early warning, as shown in FIGURE, which comprises an alarm part 1, a control part 3 and a retractable part 2. The retractable part 2 is fixedly connected with the alarm part 1 at the top, and the control part 3 at the bottom; the alarm part 1 is electrically connected with the control part 3 through a wire; the control part 3 compares the water level measured by the retractable part 2 with a preset threshold, to determine whether the alarm part 1 needs to give an alarm.

Further, the retractable part 2 measures the water level, compares it with a preset threshold, and determines the alarm level according to water depth. For example, a water depth of 5 cm can be determined as a Level 1 alarm, indicating that there is no danger, but the passers should pass the section carefully, and the alarm level will be higher as the water depth increases.

To further optimize the above technical scheme, the control part 3 comprises a control box, a circuit board and a battery. The battery is placed at the bottom of the control box; the circuit board is installed in the control box; the battery powers the circuit board.

To further optimize the above technical scheme, the circuit board comprises a wireless charging module, a control module and a wireless communication module. The wireless charging module is electrically connected to the battery; the control module is connected to the alarm part 1 and the wireless communication module; the wireless communication module wirelessly interacts with the cloud.

To further optimize the above technical scheme, the alarm part 1 consists of one or more of a visual alarm, an auditory alarm, a tactile alarm and an olfactory alarm.

Specifically, different alarm devices are optional, among which visual and audible alarms are the most common.

To further optimize the above technical scheme, the alarm part 1 comprises an insulating housing and a sensor set in it. The sensor is used to detect the current water level.

To further optimize the above technical scheme, the insulating housing comprises outer and inner tubes. The inner tube in n sections is sleeved with the outer tube, and slides inside the said outer tube.

To further optimize the above technical scheme, the water gauge further comprises a level gauge, to determine the inclination angle of the retractable part.

Specifically, the setting of the level gauge ensures that the water level can be corrected according to the inclination angle of the level gauge, to prevent any false alarms. For example, with an angle between the retractable part 2 and the horizontal plane of 60 degrees, and a water level of 30 cm, the control part 3 can calculate the actual water level of 25.98 cm based on the trigonometric function, which does not reach the alarm level.

To further optimize the above technical scheme, the water gauge further comprises a cloud server and a terminal. The cloud server communicates with the wireless communication module and the terminal.

Specifically, when the waterlogged water level comes to a certain scale on the water gauge placed beside the target road section, the sensor in the retractable part 2 transmits the current water data to the control part 3, which is then transmitted to the cloud server through the wireless communication module of the control part 3, and further to the terminal through the cloud server. When the water depth reaches the warning line of 30 cm set on the water gauge, the controller triggers the warning light to flash continuously, and the waterproof speaker to give the instruction of "pedestrians and vehicles are prohibited from passing this section" until the water subsides below the warning line.

Each embodiment in this specification is described in a progressive manner, focusing on its differences from other embodiments, and the same and similar parts between embodiments can be referred to mutually. For the device disclosed in the embodiment, the description is relatively simple since it corresponds to the method disclosed in the embodiment, and reference can be made to the method description section when needed.

The above description of the disclosed embodiment enables those skilled in the art to practice or use the present invention. Modifications to these embodiments will be apparent to those skilled in the art, and the general principles defined herein can be implemented in other embodiments without departing from the essence or scope of the present invention. Accordingly, the present invention will not be limited to the embodiment described herein, but will cover the widest scope consistent with the principles and novel features disclosed herein.

What is claimed is:

1. A water gauge for on-site monitoring and early warning, comprising an alarm part, a control part and a retractable part, wherein
    a top of the retractable part is fixedly connected to the alarm part, and a bottom of the retractable part is connected to the control part;
    the alarm part is electrically connected with the control part through a wire; and
    the control part compares a water level measured by the retractable part with a preset threshold, to determine whether the alarm part needs to give an alarm;
    wherein the control part comprises a control box, a circuit board and a battery;
    the battery is placed at a bottom of the control box;
    the circuit board is installed in the control box; and
    the battery powers the circuit board;
    wherein the circuit board comprises a wireless charging module, a control module and a wireless communication module, the wireless charging module is electrically connected with the battery;

the control module is connected to the alarm part and the wireless communication module; and the wireless communication module wirelessly interacts with a cloud.

2. The water gauge according to claim 1, wherein the alarm part comprises one or more selected from the group consisting of a visual alarm, an auditory alarm, a tactile alarm and an olfactory alarm.

3. The water gauge according to claim 1, wherein the alarm part comprises an insulating housing and a sensor, the sensor is provided inside the insulating housing, and the sensor is configured to detect a current water level.

4. The water gauge according to claim 3, wherein the insulating housing comprises an outer tube and an inner tube, the inner tube is divided into n sections, the inner tube is sleeved with the outer tube, and the inner tube slides inside the outer tube.

5. The water gauge according to claim 1, further comprising a level gauge, to determine an inclination angle of the retractable part.

6. The water gauge according to claim 1, further comprising a cloud server and a terminal, the cloud server communicates with the wireless communication module and the terminal.

7. A water gauge for on-site monitoring and early warning, comprising an alarm part, a control part and a retractable part, wherein a top of the retractable part is fixedly connected to the alarm part, and a bottom of the retractable part is connected to the control part;

the alarm part is electrically connected with the control part through a wire; and the control part compares a water level measured by the retractable part with a preset threshold, to determine whether the alarm part needs to give an alarm;

wherein the alarm part comprises an insulating housing and a sensor, the sensor is provided inside the insulating housing, and the sensor is configured to detect a current water level;

wherein the insulating housing comprises an outer tube and an inner tube, the inner tube is divided into n sections, the inner tube is sleeved with the outer tube, and the inner tube slides inside the outer tube.

8. The water gauge according to claim 7, wherein the control part comprises a control box, a circuit board and a battery;

the battery is placed at a bottom of the control box;

the circuit board is installed in the control box; and the battery powers the circuit board.

9. The water gauge according to claim 8, wherein the circuit board comprises a wireless charging module, a control module and a wireless communication module, the wireless charging module is electrically connected with the battery;

the control module is connected to the alarm part and the wireless communication module; and the wireless communication module wirelessly interacts with a cloud.

10. The water gauge according to claim 9, further comprising a cloud server and a terminal, the cloud server communicates with the wireless communication module and the terminal.

11. The water gauge according to claim 7, wherein the alarm part comprises one or more selected from the group consisting of a visual alarm, an auditory alarm, a tactile alarm and an olfactory alarm.

12. The water gauge according to claim 7, further comprising a level gauge, to determine an inclination angle of the retractable part.

* * * * *